United States Patent
Kuo et al.

(10) Patent No.: US 11,671,325 B1
(45) Date of Patent: Jun. 6, 2023

(54) DETERMINING IOT DEVICE COMPATIBILITY WITH DEPLOYMENTS

(71) Applicant: Amazon Technologies, Inc., Seattle, WA (US)

(72) Inventors: Calvin Yue-Ren Kuo, Mercer Island, WA (US); Shiwei Ni, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 664 days.

(21) Appl. No.: 15/801,264

(22) Filed: Nov. 1, 2017

(51) Int. Cl.
| | |
|---|---|
| *H04L 41/0869* | (2022.01) |
| *H04L 41/0873* | (2022.01) |
| *H04L 41/082* | (2022.01) |
| *H04L 41/0893* | (2022.01) |
| *H04L 67/00* | (2022.01) |
| *H04L 67/10* | (2022.01) |

(52) U.S. Cl.
CPC ........ *H04L 41/0869* (2013.01); *H04L 41/082* (2013.01); *H04L 41/0873* (2013.01); *H04L 41/0893* (2013.01); *H04L 67/10* (2013.01); *H04L 67/34* (2013.01)

(58) Field of Classification Search
CPC .............. H04L 41/0869; H04L 41/082; H04L 41/0873; H04L 67/10; H04L 41/0893; H04L 67/34
See application file for complete search history.

(56) References Cited

U.S. PATENT DOCUMENTS

| | | | | |
|---|---|---|---|---|
| 2003/0208569 | A1* | 11/2003 | O'Brien | H04L 41/0893 709/221 |
| 2008/0114860 | A1* | 5/2008 | Keys | G06F 8/61 709/219 |
| 2015/0350101 | A1* | 12/2015 | Sinha | H04L 67/10 709/226 |
| 2016/0065653 | A1* | 3/2016 | Chen | H04L 67/34 715/735 |
| 2017/0006116 | A1* | 1/2017 | Kelly | H04L 41/04 |
| 2017/0164417 | A1* | 6/2017 | Kress | H04B 1/0003 |
| 2017/0235783 | A1* | 8/2017 | Chen | H04W 4/70 707/691 |
| 2019/0107968 | A1* | 4/2019 | Wisnovsky | H04L 67/06 |

\* cited by examiner

*Primary Examiner* — Mohamed A. Wasel
*Assistant Examiner* — Timothy Sowa
(74) *Attorney, Agent, or Firm* — Robert C. Kowert; Kowert, Hood, Munyon, Rankin & Goetzel, P.C.

(57) ABSTRACT

A provider network implements a service for receiving a request for a deployment from an IoT device and determining whether the IoT device is compatible with a deployment. The service may determine a configuration of the IoT device based on configuration information included in the request for the deployment. The service may then determine whether the configuration of the connected device satisfies configuration requirements for one or more components (e.g., functions) required for the deployment. In some cases, a particular version of a plurality of versions of a function may be compatible with the connected device. If the service determines that the IoT device is compatible with all of the components that are required for the deployment, then the service may generate a package that includes all of the components. The service may then deploy the package to the IoT device.

20 Claims, 11 Drawing Sheets

DETERMINING IOT DEVICE COMPATIBILITY WITH DEPLOYMENTS

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, environmental sensors, etc.

In many cases, IoT devices may communicate with a remote provider network to use one or more IoT services provided by the provider network. For example, an IoT device may collect data and transmit the data to the provider network. The provider network may then store the data or process the data using one or more functions. Some IoT devices may be capable of running the same or similar functions at the client site. For example, a client may download a function from the provider network in order to process data at the IoT device.

Due to the variety of hardware architectures and runtime execution environments of different IoT devices, the same function may not run properly, or may not run at all, on various IoT devices. For example, if a function of a provider network that is written in python is deployed to an IoT device that does not have a python interpreter configured, the function will not work on the IoT device. As another example, a function that is written with native code for an x86 processor that is deployed to an IoT device that uses an ARM processor will not work on the IoT device.

Figure 1:
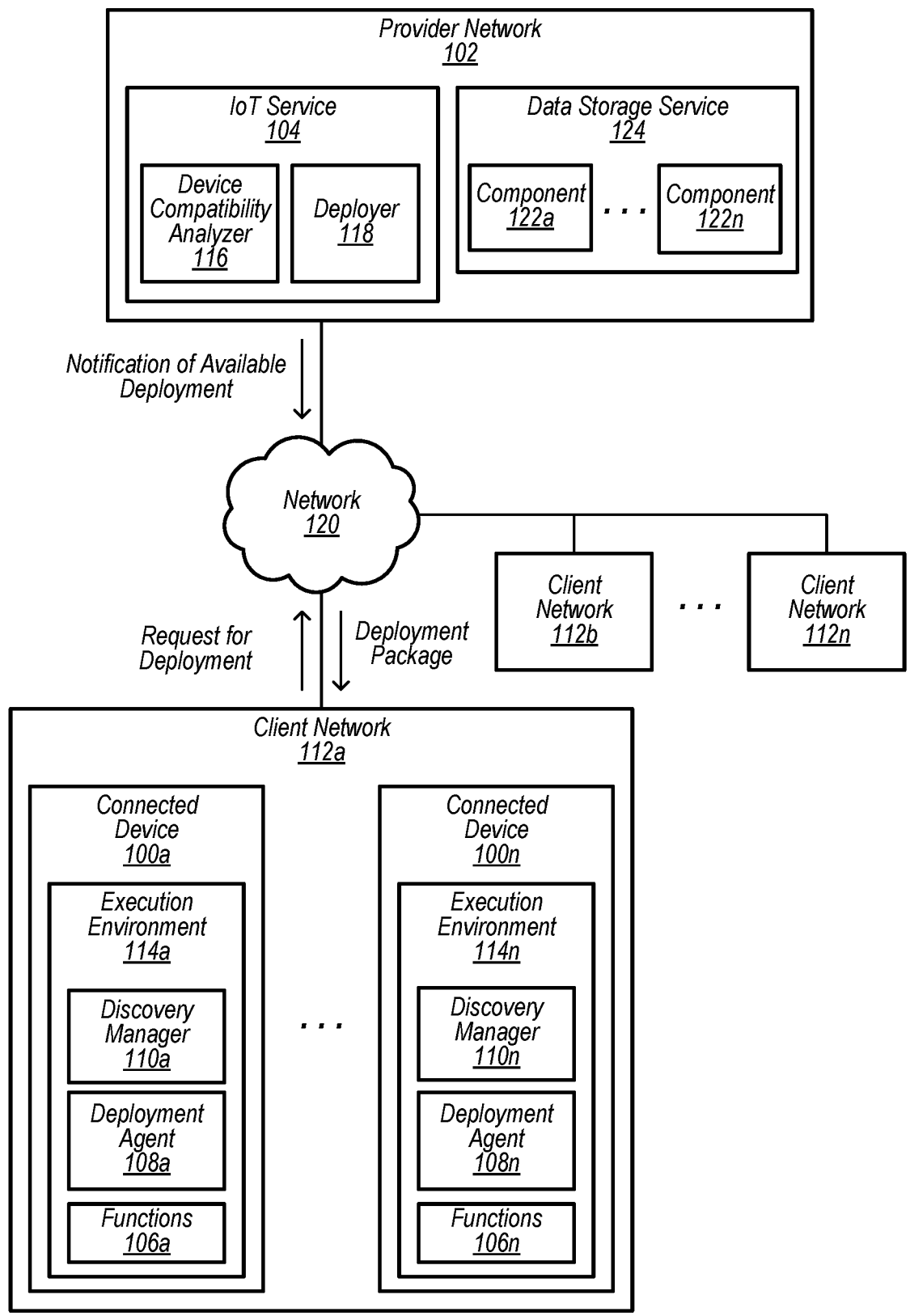
FIG. 1 illustrates a system for determining compatibility of IoT devices with a deployment and deploying packages to IoT devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement determining IoT device compatibility with deployments and sending deployment packages to IoT devices. A service of a provider network may receive a request for a deployment from an IoT device. The request may include configuration information for the IoT device. The service may determine a configuration of the IoT device based on the configuration information. The service may then determine whether the configuration of the IoT device satisfies configuration requirements for one or more components of the deployment. If so, then the service deploys a package to the IoT device or provides a location for the package. If not, the service may provide an indication to the IoT device that the IoT device is not compatible with the deployment.

In embodiments, an "IoT device" and a "connected device" may refer to the same type of device. In various embodiments, an "IoT device" or a "connected device" may refer to any type of computing device suitable for communicating, via one or more networks, with one or more devices of a remote network (e.g., remote provider network). In embodiments, an "endpoint" may be one or more computing devices and/or one more services that are part of a local network or a remote network, such that information may be transmitted to or from the endpoint via one or more network connections.

In embodiments, a "component" may be a function and/or a version of a function, data configured to execute a function or portion of a function (e.g., function code), and/or any other type of data that may be used as a deployment or as a portion of a deployment. Thus the word "function" may be replaced by the word "component" and vice versa, in various embodiments. In embodiments, a "deployment" may be one or more components and/or functionality corresponding to one or more components that may be used by an IoT device by an IoT device and/or may configure an IoT device such that the IoT device may perform one or more functions and/or modify functions of the IoT device. For example, an IoT device may request a deployment of an improved facial recognition algorithm and then download a deployment package that includes one or more functions that the IoT device may install and execute to improve accuracy in facial recognition.

By determining IoT device compatibility with a deployment, various embodiments allow for advantages over traditional techniques for using functions on IoT devices or deploying functions to IoT devices. For example, if a service determines that an IoT device is not compatible with one or more of the components required for a requested deployment, then the service can determine not to send any the components to the IoT device. In embodiments, the service may send a message indicating incompatibility instead of sending components that will not work properly on the IoT device. This may prevent unnecessary use of network bandwidth, computing resources, time, and storage space by the computing devices of the provider network and/or the client network.

In embodiments, since the IoT device includes the configuration information in the request for a deployment, the provider network may immediately (e.g., in response to receiving the request) determine whether the deployment, including any functions of the deployment (or any versions of functions), is compatible with the IoT device. In response, the IoT service may generate and provide the deployment package or provide an indication that the device is not compatible with the deployment. Moreover, different functions (or versions of functions) may be assembled into different packages for different IoT devices based on configuration information provided in the requests from the different IoT devices, even though the different functions and/or versions of functions are for the same requested deployment.

FIG. 1 illustrates a system for determining compatibility of IoT devices with a deployment and deploying packages to IoT devices, according to some embodiments. The connected devices 100 depicted in FIG. 1 may be the same type of connected device, and include some or all of the same components as other connected devices depicted in FIGS. 1-10, in embodiments. Although certain components of the provider network 102 and/or the IoT service 104 are described as performing various actions, any of the actions described as performed by the provider network 102 and/or the IoT service 104 may be performed by any hardware and/or software component of the provider network 102, the IoT service 104, or any other components of the networks in FIGS. 1-10.

In the depicted embodiment, a provider network 102 includes an IoT service 104 that may be used to configure and deploy functions 106, deployment agents 108 and/or discovery managers 110 to respective connected devices 100 of one or more client networks 112. As shown, any number of client networks 112 may exist, and each of the client networks 112 may include any number of connected devices 100.

In embodiments, an execution environment 114 may execute functions 106, a deployment agent 108, and or a discovery manager 110 on each respective connected device 100. The execution environment 114 may be a function execution environment and/or any other type of runtime execution environment. Thus, the execution environment may include any number of software and/or hardware components usable to run and/or execute one or more operating systems, processes, functions, and/or applications. In embodiments, an execution environment (or functions, the deployment agent, or the discovery manager) may be installed on a connected device before or after being shipped to a client. In some embodiments, the execution environment may be downloaded from the provider network 102 to the connected device and then installed on the connected device.

As shown, the IoT service 104 may include a device compatibility analyzer 116 and a deployer 118. In embodiments, the IoT service 104 may include any number of other components that perform various functions and/or services for client networks and/or connected devices. Some additional functions and/or services that may be provided by the IoT service 104 are described below.

In embodiments, the deployer 118 may determine that a new function is available for deployment to one or more connected devices. In response, the deployer 118 may provide, to connected devices of one or more of the client networks, a notification indicating that a deployment is available. In embodiments, the notification includes a unique identifier usable for identifying the deployment. The notification may be provided via a wide-area network 120 (e.g., the Internet). Any other data that is sent between the provider network 102 and any devices of the client networks 112 may be sent via the network 120 (e.g., functions, packages, or any other components).

In response to receiving the notification, any number of the connected devices may send to the IoT service 104 a request for the deployment. In embodiments, a request from a given connected device may include a unique identifier for the deployment and/or any amount of other information indicating a configuration (e.g., software and/or hardware) of the connected device. In embodiments, the discovery manager 110 determines the configuration of the connected device, and the deployment agent of the connected device includes some or all of the configuration information in the request. The discovery manager 110 may determine the configuration of the connected device by using one or more techniques. For example, the discovery manager may run a discovery function to determine some or all of the configuration information and/or obtain some or all of the configuration information from a file or other data store included in the connected device.

In embodiments, some or all of the above information may be included in a header and/or one or more fields of a packet. For example, at least some of the above information may be included in the user agent field of the header of an HTTP (hyper-text transport protocol) packet. In embodiments, any other network protocol messages and/or fields of network protocol messages may be used to send the above information from the connected device to the IoT service 104.

In embodiments, configuration information of a request from a given connected device may include any suitable type of configuration information that may be used to determine if the given connected device is compatible with one or more components of a deployment. For example, the configuration parameters may include one or more of: a version of an execution environment of the connected device, a processor architecture of the connected device, whether one or more interpreters are installed on the connected device, a type of an installed interpreter, whether the connected device comprises one or more graphics processing units (GPUs), a type of an installed GPU, whether the connected device comprises one or more floating point units (FPUs), a type of an installed FPU, whether the connected device comprises wireless communication capability, or a type of installed wireless communication capability.

In various embodiments, in response to receiving the request, the device compatibility analyzer 116 may determine a configuration of the connected device based at least in part on the configuration information. In embodiments, the configuration information may be provided in a particular format, may be encoded, or may be provided as a fingerprint, as described below.

In some embodiments, the device compatibility analyzer 116 may use a deployment identifier received in the request to identify and/or determine software and/or hardware configuration requirements (e.g., of a given connected device) for one or more components that are required for the deployment. In embodiments, the components 122 (e.g., functions) for one or more deployments are stored in a data storage service 124 of the provider network. Any other data used by the IoT service may also be stored in the data storage service 124, such as configuration requirements for each component.

In response to determining the configuration of the connected device, the device compatibility analyzer 116 may determine whether the configuration of the connected device satisfies configuration requirements for one or more components required for the deployment. For example, the device compatibility analyzer 116 may compare one or more configuration requirements of one or more components to the configuration of the connected device.

If the configuration of the connected device satisfies configuration requirements for one or more components that are required for the deployment, then the device compatibility analyzer 116 may determine that the deployment is compatible with the connected device. For example, if a configuration requirement for a particular function is version "1.1.2" of a particular execution environment and the device has version "1.1.2" of the particular execution environment, then the device compatibility analyzer 116 may determine that the connected device is compatible with the particular function.

In embodiments, any number of configuration requirements must match the configuration of the connected device in order for the device compatibility analyzer 116 to determine that the connected device is satisfies configuration parameters for a given component of a deployment. For example, in addition to the version of the particular execution environment matching as described above, a configuration requirement may be that the connected device includes a particular hardware architecture or processor architecture (e.g., manufactured by a particular company or a particular hardware standard).

In some embodiments, in response to a determination that the configuration of the connected device satisfies the configuration requirements for the deployment, the deployer 118 may generate a package comprising the one or more components. For example, the deployer 118 may obtain on or more particular components 122 from the data storage service 124 and assemble them into a package. The deployer may then deploy the package to the connected device.

In some embodiments, in response to determining that the function is compatible with the connected device, the deployer may provide to the connected device a location from which the connected device can obtain the package. For example, the deployer 118 may provide a network address (e.g., network IP address) or an endpoint from which the connected device can obtain the package. The connected device may download the package from the location. In embodiments, the connected device may also receive and/or download additional information and/or components that may be used to install and/or execute the function on the connected device.

In embodiments, one or more packages that each include one or more components may be sent to one or more connected devices, even though the connected devices do not request a deployment. For example, if the IoT service determines that one or more packages are ready to be deployed to a connected device (e.g., as part of an update for an execution environment and/or application installed on the connected device), then the IoT service may initiate and/or deploy the packages to the connected device.

For example, in various embodiments the IoT service may send to the connected device an update notification (e.g., for an execution environment of the connected device or an application installed on the connected device). In response to receiving the update notification, the connected device may send to the IoT service configuration information of the connected device. For example, the connected device may determine its current configuration and send it to the IoT service. The configuration information may include configuration information that may be used to select the appropriate version of update code or type of update, including any of the configuration information (and formats) described herein.

In response to receiving from the connected device the configuration information, the IoT service may generate an update package based on the configuration information (e.g., the same or similar process as described herein for generating a deployment package). The IoT service may then send the update package to the connected device. The connected device may then update the execution environment and/or one or more applications using one or more components (e.g., functions, code, binary code, data, etc.) provided in the update package.

Figure 2:
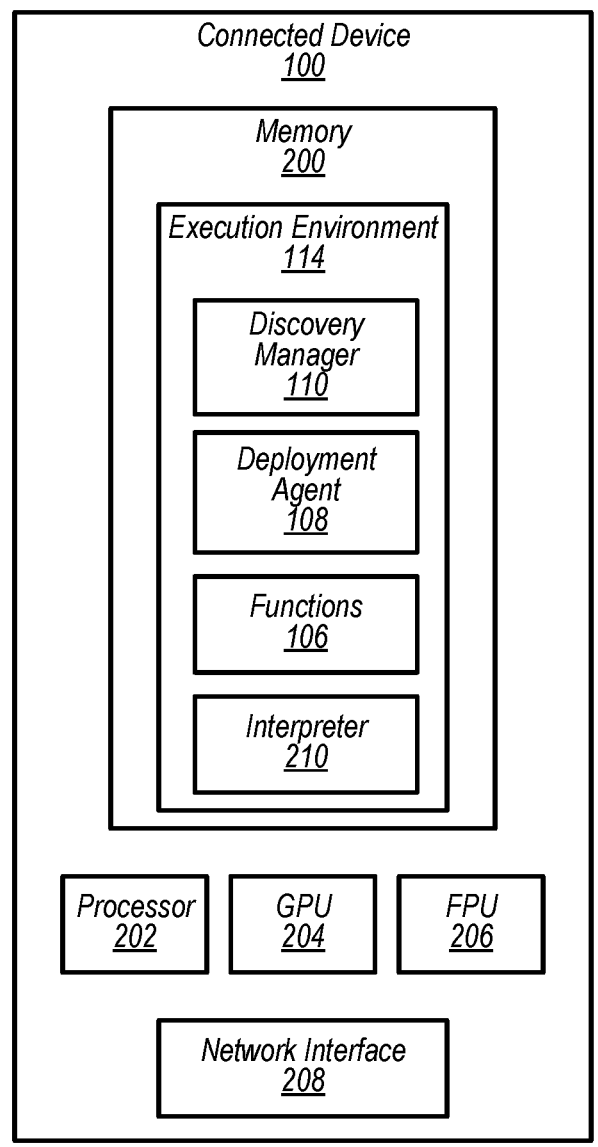
FIG. 2 is a block diagram illustrating example components of a connected device, according to some embodiments.

FIG. 2 is a block diagram illustrating example components of a connected device, according to some embodiments, according to some embodiments. In the depicted embodiment, the connected device 100 includes a memory 200, a processor 202 (e.g., CPU), a graphics processing unit 204 (GPU), a floating point unit 206 (FPU), and a network interface 208. In embodiments, the connected device 100 may include one or more additional memories, processors, GPUs, FPUs, or other processors. As described above, different functions that are available for deployment from the IoT service may require different types of processors, GPUs, FPUs, and/or other hardware components of the connected device 100.

The memory includes an execution environment 210 suitable for running a discovery manager 110, a deployment agent 108, one or more functions 106, and one or more programming language interpreters 216. In some embodiments, the execution environment may provide for event-driven execution of functions, some of which may be deployed from the deployer 118. For example, one or more of the functions may be invoked in response to the execution environment detecting a triggering event (e.g., receiving and/or detecting a message, command, or any other data from a data source). In embodiments, one or more event sources may be part of the connected device. For example, a temperature sensor may be a type of data source that provides temperature data to the connected device, which triggers execution (e.g., launches) a function. In embodiments, one or more of the functions received from the deployer 118 may be compatible with an execution environment of the provider network (e.g., executable by an execution environment of the provider network).

In embodiments, the network interface 208 communicatively couples the connected device 100 to the local network. Thus, the connected device 100 transmits data to and/or receives data from one or more other data source devices, connected devices, the IoT service 104, or other endpoints via the network interface 208. In embodiments, the network interface 208 may transmit and receive data via a wired or wireless interface.

In various embodiments, the connected device 100 may provide high levels of security (e.g., encrypted messages) to protect data being communicated between connected devices and also between the connected device and the provider network 102. The connected device may provide a simple yet powerful processor and/or operating system to provide platform-agnostic capabilities. In some embodiments, the size of one or more memories and/or one or more processors used by one or more servers of the provider network 102 to implement services (e.g., IoT service 104 or components of IoT service) may be at least an order of magnitude larger than the size of the memory and/or the processor used by the connected device 100. However, the connected device 100 may still be powerful enough to run a same or similar function execution environment 206 as one that runs on one or more servers of the provider network 102, in order to invoke and execute the same functions (e.g., event-driven functions).

In the depicted embodiment, the execution environment 210 runs one or more interpreters 216. The interpreter 216 may be a program or application that executes/performs instructions written in a particular programming language (e.g., python, perl, etc). In embodiments, the interpreter 216 executes/performs the instructions without previously compiling them (e.g., into machine language).

In embodiments, the execution environment 210 runs the deployment agent 212. The deployment agent 212 may be a program or application that communicates with the deployer 118 and the device compatibility analyzer 116 and downloads functions to the connected device. For example, the deployment agent 212 may receive from the deployer 118 a notification of a function that is available for deployment, send a request for the function deployment to the device compatibility analyzer 116, and receive the function from the deployer 118.

Figure 3:
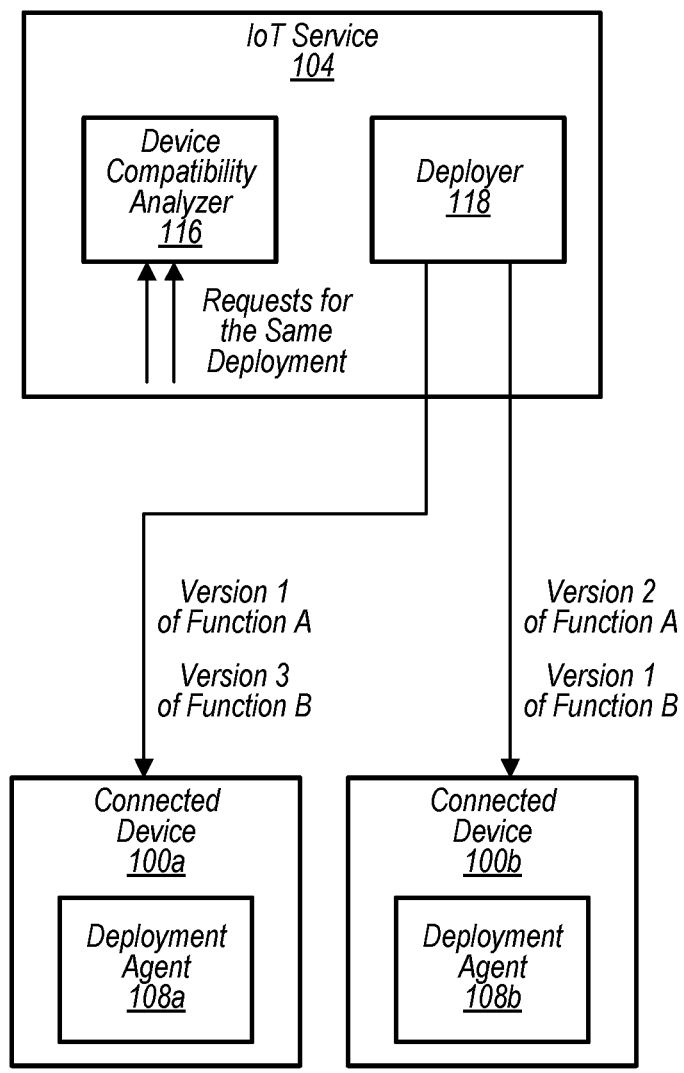
FIG. 3 illustrates a system for providing different versions of functions to different IoT devices for the same deployment, according to some embodiments.

FIG. 3 illustrates a system for providing different versions of functions to different IoT devices for the same deployment, according to some embodiments. In embodiments, functions (e.g., function code) may be stored by the IoT service 104, a data storage service 124, and/or by another data storage service of the provider network 102. As shown, a device compatibility analyzer 116 of an IoT service 104 receives a request for the same deployment from the connected device 100a and the connected device 100b. For example, each request may indicate the same deployment identifier.

In embodiments, in response to receiving the notification that the deployment is available, a deployment agent of a connected device may determine whether to send a request for the deployment based on one or more factors. For example, the deployment agent may send the request in response to determining that the a function of the deployment is a newer version of the function currently deployed on the connected device and/or in response to determining that the function belongs to one or more categories of functions or groups of functions assigned to the connected device. For example, a function may belong to a category of functions for sensing temperature and/or a category of functions that are for running on a particular hardware component (e.g., processor, GPU, FPU) or software component (e.g., version of an execution environment).

In the depicted embodiment, the connected device 100a and the connected device 100b each send a request to device compatibility analyzer 116 for deployment of the same function. The deployment agents of each connected device may send the respective requests in response to receiving a notification from the deployer 118 that the function is available for deployment. The requests may include any of the information and/or configuration information described above. For example, the device compatibility analyzer 116 receive an identifier for the deployment in each request and use the identifier to determine the components required for the deployment, as well as software and/or hardware configuration requirements for each of the components.

In response to determining the configuration of the connected device 100a, the device compatibility analyzer 116 may determine whether the configuration of the connected device 100a satisfies configuration requirements for one or more components required for the deployment. For example, one of the required components may be a function that has multiple different versions that are available, depending on device configurations. For example, one version of a function written in a particular language (e.g., python) may include native code or binary for a specific processor architecture and/or brand of processor (e.g., x86), while another version of the same function written in the same language may include native code or binary for a different processor architecture and/or brand of processor. As shown, the device compatibility analyzer 116 determines that the connected device 100a satisfies configuration requirements for "Version 1" of "Function A."

Another one of the required components may be another function that has multiple different versions ("Function B"). The device compatibility analyzer 116 may determine that the connected device 100a satisfies configuration requirements for "Version 3" of "Function B." However, due to a different configuration of the connected device 100b, the device compatibility analyzer 116 may determine that the connected device 100b satisfies configuration requirements for "Version 2" of "Function A" and also satisfies configuration requirements for "Version 1" of "Function B." The configuration of connected device 100b may be different than that of connected device 100a due to any number of software and/or hardware differences, including differences for any number of the configuration examples given above (e.g., version of execution environment, processor architecture, interpreters, GPUs, FPUs, etc.).

In the example embodiment, the requested deployment may include Function A and Function B. However, any number of functions and/or components may be included for a given deployment. Moreover, any number of the functions and/or components may include any number of multiple versions that are selected depending on device configuration, as described above. The deployer 118 may generate a deployment package for connected device 100a that includes Version 1 of Function A and Version 3 of Function B. Similarly, the deployer 118 may generate a deployment package for connected device 100b that includes Version 2 of Function A and Version 1 of Function B. The packages may then be provided to the respective connected devices as discussed above for FIG. 1.

In some embodiments, the device compatibility analyzer 116 may determine that two or more versions of a function are compatible with a given connected device. If this occurs, then the device compatibility analyzer 116 may select, based on one or more criteria, a particular one of the versions of the function to include in the deployment package.

For example, the device compatibility analyzer 116 may select the most recently developed and/or released version of the function. As another example, the device compatibility analyzer 116 may select the version of the function that performs best on the connected device 102a (e.g., shortest execution time and/or consumes the least power and/or bandwidth during execution). As another example, the device compatibility analyzer 116 may select the version of the function that has the largest number of configuration requirements that match the configuration of the connected device. In embodiments, one or more of the above criteria may be used to determine the version of the function that is compatible with the connected device (e.g., selecting the version that is "most" compatible).

In some embodiments, the deployment packages (or at least some of the packages) have already been generated before the IoT service receives requests from the connected devices. For example, one package available for deployment at the IoT service may include Version 1 of Function A and Version 3 of Function B, while another package may include Version 2 of Function A and Version 1 of Function B. The IoT service may then select the first package for deployment to device 100a and select the other package for deployment to device 100b based on the different configurations of the devices, as described above.

Figure 4:
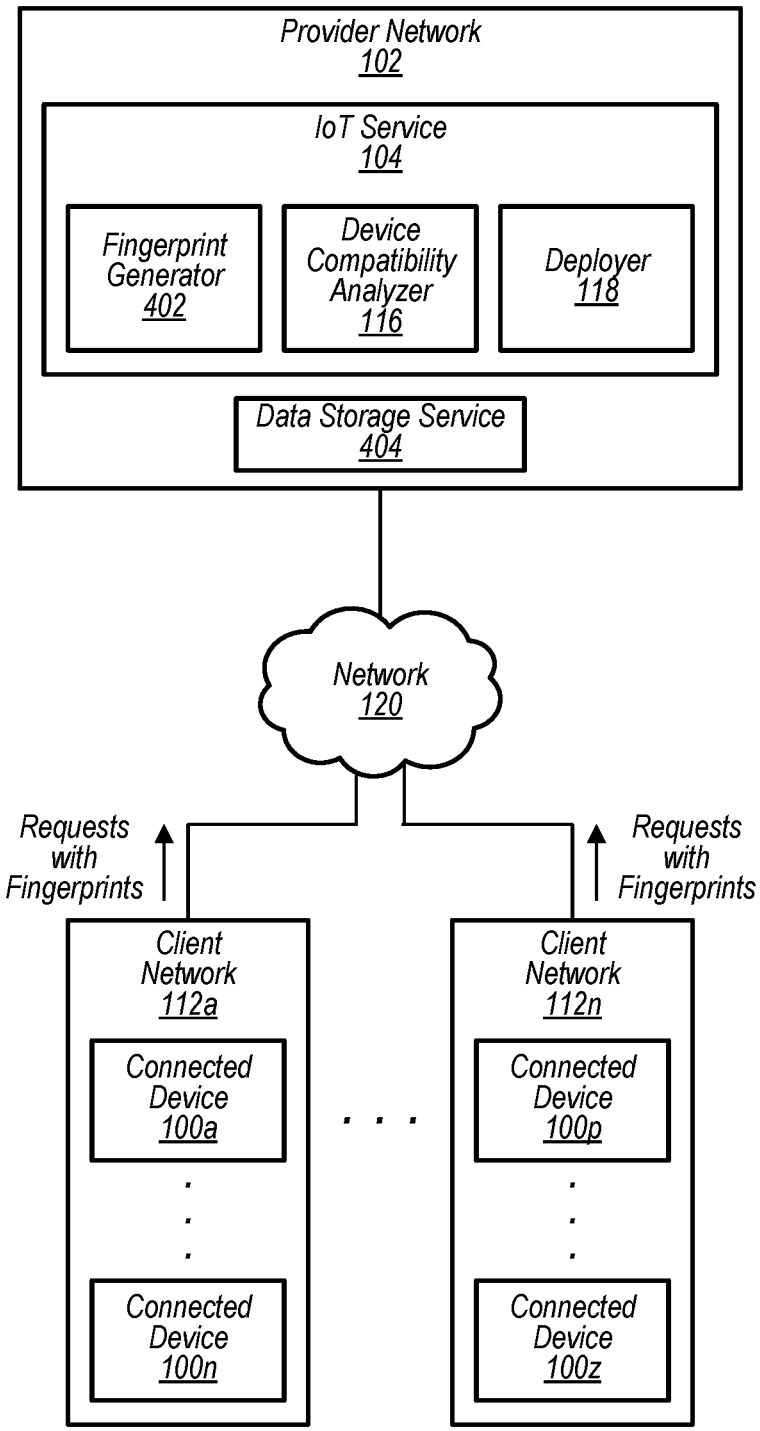
FIG. 4 illustrates a system for generating fingerprints that correspond to IoT device configurations and using the fingerprints to determine whether the IoT device configuration has changed, according to some embodiments.

FIG. 4 illustrates a system for generating fingerprints that correspond to IoT device configurations and using the fingerprints to determine whether the IoT device configuration has changed, according to some embodiments. In the depicted embodiment, multiple connected devices from two or more different client networks 112 send requests for deployments. As discussed above, a request for a given connected device includes configuration information of the given connected device.

In embodiments, a fingerprint generator 402 generates, based on the determined configuration of the connected device, a fingerprint corresponding to the particular configuration of the connected device. For example, the fingerprint generator 402 may generate a fingerprint as a unique identifier corresponding to the determined device configuration of the connected device 100a. The fingerprint generator 402 may then store the fingerprint (e.g., at a data storage service 404 of the provider network).

At a later point in time, the IoT service may receive another request for a deployment from the connected device. Instead of including the configuration information as before, the other request may include a fingerprint that was generated at the connected device (e.g., based on a current configuration of the connected device).

The IoT service may determine whether the stored fingerprint matches the received fingerprint. If so, then the IoT service may determine that the configuration of the connected device has not changed (e.g., is the same as the previously determined configuration). However, if the stored fingerprint does not match the received fingerprint, then the IoT service may determine that the configuration of the connected device has changed. If so, then the IoT service may send a request to the connected device for the connected device to provide the configuration information in the previous format so that the IoT service can generate a new fingerprint based on the changed configuration of the connected device.

In some embodiments, the IoT service may also send the stored fingerprint to the connected device for an additional comparison of fingerprints by the connected device. Thus, the connected device and the IoT service may exchange fingerprints and may each perform comparisons between each other's fingerprints to determine whether they match and/or to determine whether the configuration of the connected device has changed.

For example, after the connected device sends the request for deployment that includes the fingerprint generated by the connected device, the connected device may then receive the stored fingerprint from the IoT service and compare the stored fingerprint to the fingerprint generated by the connected device. If they match, then the connected device determines that the configuration of the connected device has not changed since the previous request and determines not to send any additional configuration information to the IoT service. However, if they do not match, then the connected device may determine that the configuration information has changed since the previous request. In that case, the connected device will send the current configuration of the connected device to the IoT service.

In some embodiments, when the connected device requests a new deployment, the above comparison of fingerprints takes place on the connected device instead of at the IoT service. In such embodiments, the connected device receives a fingerprint from the IoT service and determines whether or not the configuration of the connected device has changed based on comparing the received fingerprint and a fingerprint newly generated by the connected device. If they do not match, the connected device sends the new configuration information (or just the changes to the configuration information) to the IoT service. The IoT service may then generate a new fingerprint based on the new configuration information for the connected device. This new fingerprint may then be sent to the connected device in response to a future request for a deployment from the connected device.

However, in some embodiments, the connected device may simply store previous fingerprint that it generated for a previous request, and use that stored fingerprint instead of obtaining it from the IoT service. Thus, the connected device may compare a fingerprint newly generated by the connected device to the stored fingerprint. Based on the comparison, the connected device may determine whether the configuration has changed. If so, the connected device may send the new configuration information (or just the changes to the configuration information) to the IoT service.

Thus, in various embodiments, the comparing of fingerprints and associated determinations described above may occur at the IoT service, at the connected device, or at both the IoT service and at the connected device. In embodiments when both sides perform the comparisons, each side may verify that the other side has the correct version of the fingerprint before proceeding with the remaining steps of deployment described above.

In some embodiments, techniques other than (or in addition to) fingerprints may be used by a connected device to provide configuration information of the connected device to the IoT service. For example, the connected device may encode its configuration information before providing it to the IoT service. In embodiments, the configuration information may be an encoded compact representation of the configuration of the connected device (e.g., a bloom filter or other information generated by an encoding/hashing algorithm). Upon receiving the request for deployment, the IoT service may decode the configuration information.

In some embodiments, multiple connected devices may be manufactured and/or configured according to the same configuration. For example, thousands or millions of connected devices of a particular type may be manufactured according to a particular configuration. In such cases, the IoT service may store the configuration information and the corresponding fingerprint for the particular type of connected device. When a connected device of the particular type starts up, it provides a fingerprint to the IoT service. The IoT service may determine that the fingerprint matches the stored fingerprint, and in response, determine the configuration based on the stored configuration information. By storing the one copy of the fingerprint and corresponding default configuration information that applies to multiple connected devices of the same type, a large amount of storage space may be saved or kept free, and network bandwidth consumption may be reduced because the fingerprint is transmitted instead of the non-fingerprint configuration information as described above.

Figure 5:
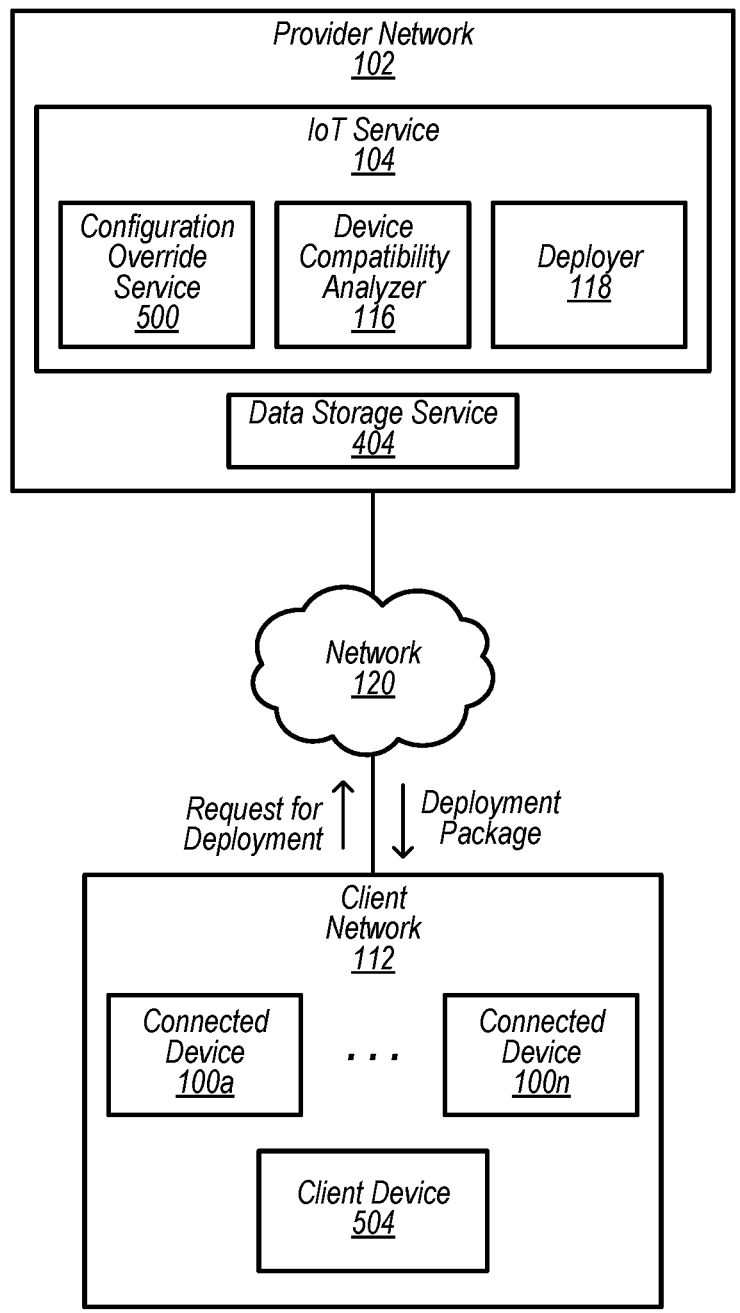
FIG. 5 illustrates a system for applying configuration overrides to configuration information for IoT devices, according to some embodiments.

FIG. 5 illustrates a system for applying configuration overrides to configuration information for IoT devices, according to some embodiments. In the depicted embodiment, the IoT service 104 includes a configuration override service 502 that may be used to changing one or more portions of the configuration information based on one or more configuration overrides.

In embodiments, the IoT may store data (e.g., identifiers, configuration data, etc.) for individual connected devices 100. For example, a device registry storing data for connected devices may be maintained within the data storage service 124 or another location of the provider network.

A client computing device 504 may allow a user of a client to enter and update data (e.g., via graphical user interface and/or application programing interface) in the device registry for individual connected devices. One type of data that may be stored for a given individual connected device is a configuration override. For example, a user may store a configuration override for a type of FPU of the connected device 100a that indicates a particular FPU type and FPU precision on the connected device (e.g., type "A" and precision "X"). Any other number of configuration overrides may also be stored for other portions of the configuration (e.g., processor architecture, interpreters, etc.).

When the connected device 100a sends a request for deployment of a function, the configuration information of the request may indicate type "B" and precision "Y." In embodiments, the configuration override service may determine that one or more configuration overrides exist for the received configuration information.

In response to determining that the configuration overrides exist, the configuration override service may change one or more respective portions of the configuration information based on the one or more configuration overrides. For example, the configuration override service may change the configuration information for the FPU from type "B" and precision "Y" to type "A" and precision "X."

The ability to allow a user to manually override one or more portions of configuration information may be advantageous in different situations. For example, a connected device (or multiple connected devices of a particular type) may in some cases provide incorrect values for one or more portions of configuration information. Thus, the configuration information may be manually overridden, at least until the problem is fixed by the manufacturer or configuring entity. In some cases, a user may wish to download a different version of one or more functions than what the IoT service selects based on the configuration information. Thus, the user may override one or more parameters to cause the device compatibility analyzer to select the desired version of the one or more functions for including in a deployment package for a connected device.

In embodiments, the IoT service may include any other number of services that allow a user of a client to enter and update data for any number of deployments (e.g., via a graphical user interface of the client device 504 and/or an application programing interface). For example, a client may create and/or define a deployment by specifying what components (and versions of components) and/or functionality are required for the deployment. In embodiments, the client may also specify any number of device configuration requirements for each of the components of the deployment.

Figure 6:
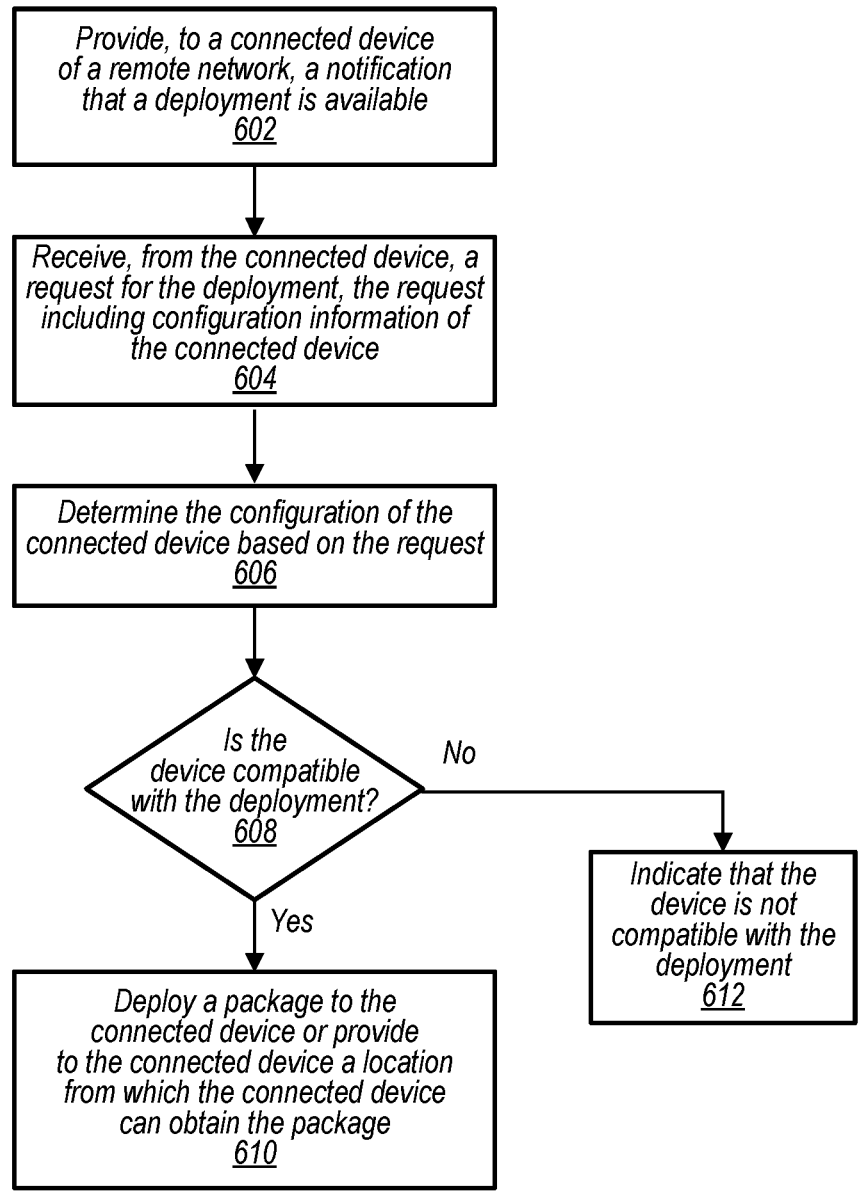
FIG. 6 is a flow diagram illustrating determining whether an IoT device is compatible with a deployment, according to some embodiments.

FIG. 6 is a flow diagram illustrating determining whether an IoT device is compatible with a deployment, according to some embodiments. One or more portions of the illustrated processes of FIGS. 6-10 may be performed via any of one or more components or services of a provider network 102 and/or connected devices 100.

At block 602, the IoT service provides, to a connected device of a remote network, a notification indicating that a deployment is available. For example, the IoT service may include one or more deployment packages that have been generated and are ready for deployment. As discussed below, one of the deployment packages may be selected for a particular device, depending on the configuration of the device. In embodiments, the notification may include an identifier. At block 604, the IoT service receives, from the connected device, a request for the deployment, wherein the request includes configuration information of the connected device (e.g., a version of a function execution environment of the connected device, a hardware architecture of the connected device, etc.).

At block 606, the IoT service determines the configuration of the connected device based on the request. At block 608, the IoT service determines whether the connected device is compatible with the deployment, as described above. If the IoT service determines that the connected device (e.g., the function execution environment, etc.) is compatible with the deployment, then at block 610 the IoT service deploys the package to the connected device or provides to the connected device a location from which the connected device can obtain the package. Returning to block 608, if the IoT service determines that the connected device is not compatible with the deployment, then at block 612 the IoT service indicates to the connected device that the connected device is not compatible with the deployment.

Figure 7:
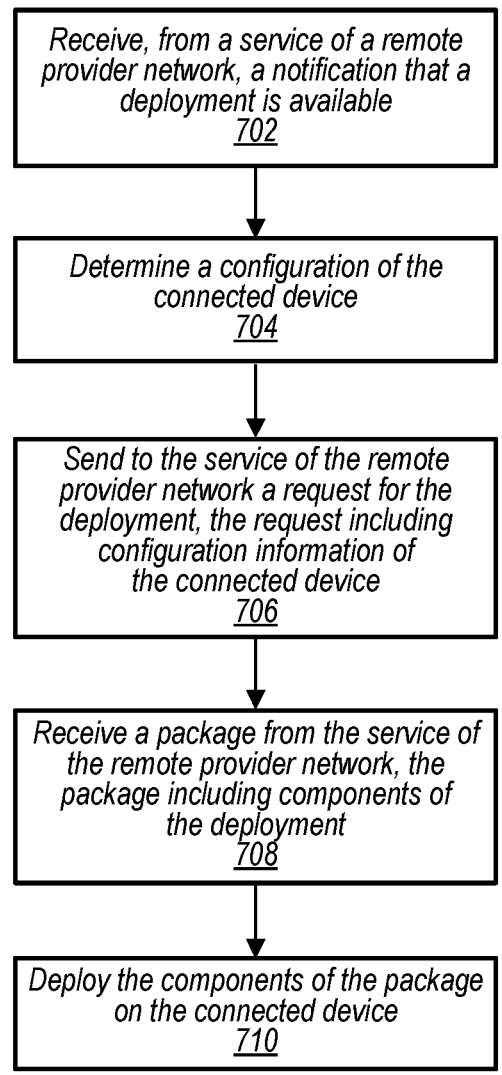
FIG. 7 is a flow diagram illustrating an IoT device requesting a deployment and receiving a deployment package based on the device configuration, according to some embodiments.

FIG. 7 is a flow diagram illustrating an IoT device requesting a deployment and receiving a deployment package based on the device configuration, according to some embodiments. At block 702, the connected device receives, from a service of a remote provider network, a notification that a deployment is available. At block 704, the connected device determines and/or verifies a configuration of the connected device (e.g., via the discover manager).

At block 706, the connected device sends to the IoT service a request for the deployment. In embodiments the request may include a unique identifier for the deployment and/or configuration information of the connected device, as described above. At block 708, the connected device receives a package from the IoT service. The package may include one or more components required for the deployment. At block 710, the connected device deploys the one or more components of the package onto the connected device (e.g., installs one or more functions and/or data used by one or more functions).

Figure 8:
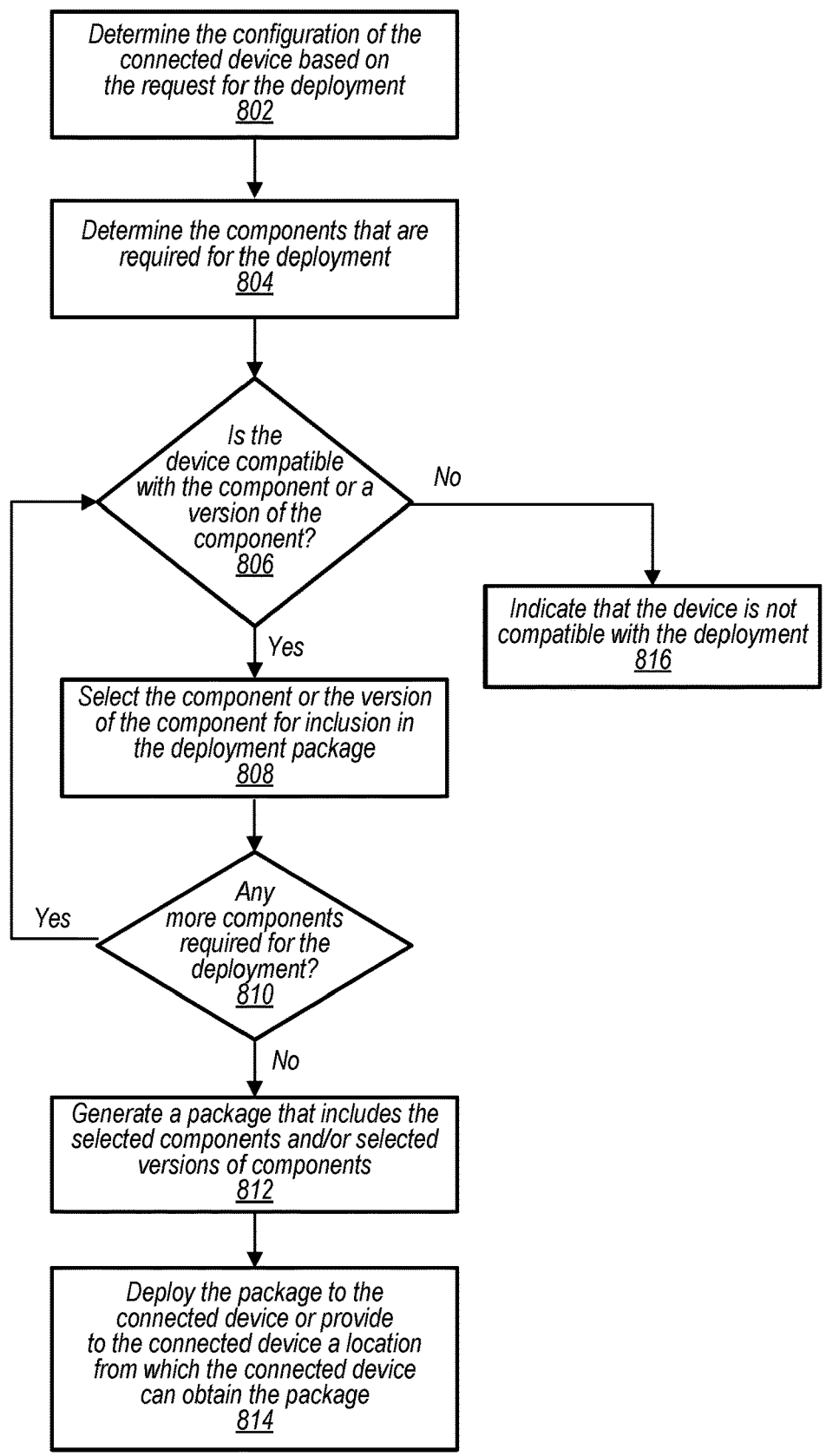
FIG. 8 is a flow diagram illustrating determining whether an IoT device is compatible with multiple components of a deployment, according to some embodiments.

FIG. 8 is a flow diagram illustrating determining whether an IoT device is compatible with multiple components of a deployment, according to some embodiments. At block 802, the IoT service determines the configuration of the connected device based on a request for a deployment from the IoT device. At block 804, the IoT service determines and/or identifies the components that are required for the deployment. As described above, this may include determining one or more device configuration requirements for each of the components to be compatible with the device (e.g., to function properly and/or without errors).

At block 806, the IoT service determines whether the connected device is compatible with a particular component or with a version of a particular component required for the deployment. If the IoT service determines that the connected device is compatible with the particular component or with a version of the particular component, then at block 808, the IoT service selects the particular component or the version of a particular component for inclusion in a deployment package for the connected device. For example, the IoT service may store an entry or other data that indicates the particular component or the version of a particular component is to be included in the deployment package when (or if) the deployment package is generated for the connected device. At block 810, the IoT service determines whether there is another component required for the deployment. If so, then the process returns to block 806 to determine whether the connected device is compatible with the other component or with a version of the other component.

At block 810, if the IoT service determines that there are no more components required for the deployment, then at block 812, the IoT service generates a package that includes the components (e.g., the components and/or the versions of components selected at block 808) required for the deployment. At block 814, the IoT service deploys the package to the connected device or provides to the connected device a location from which the connected device can obtain the package. Returning to block 806, if the IoT service determines that the connected device is not compatible with a component of the deployment or a version of a component of the deployment, then at block 816 the IoT service indicates to the connected device that the connected device is not compatible with the deployment.

Figure 9:
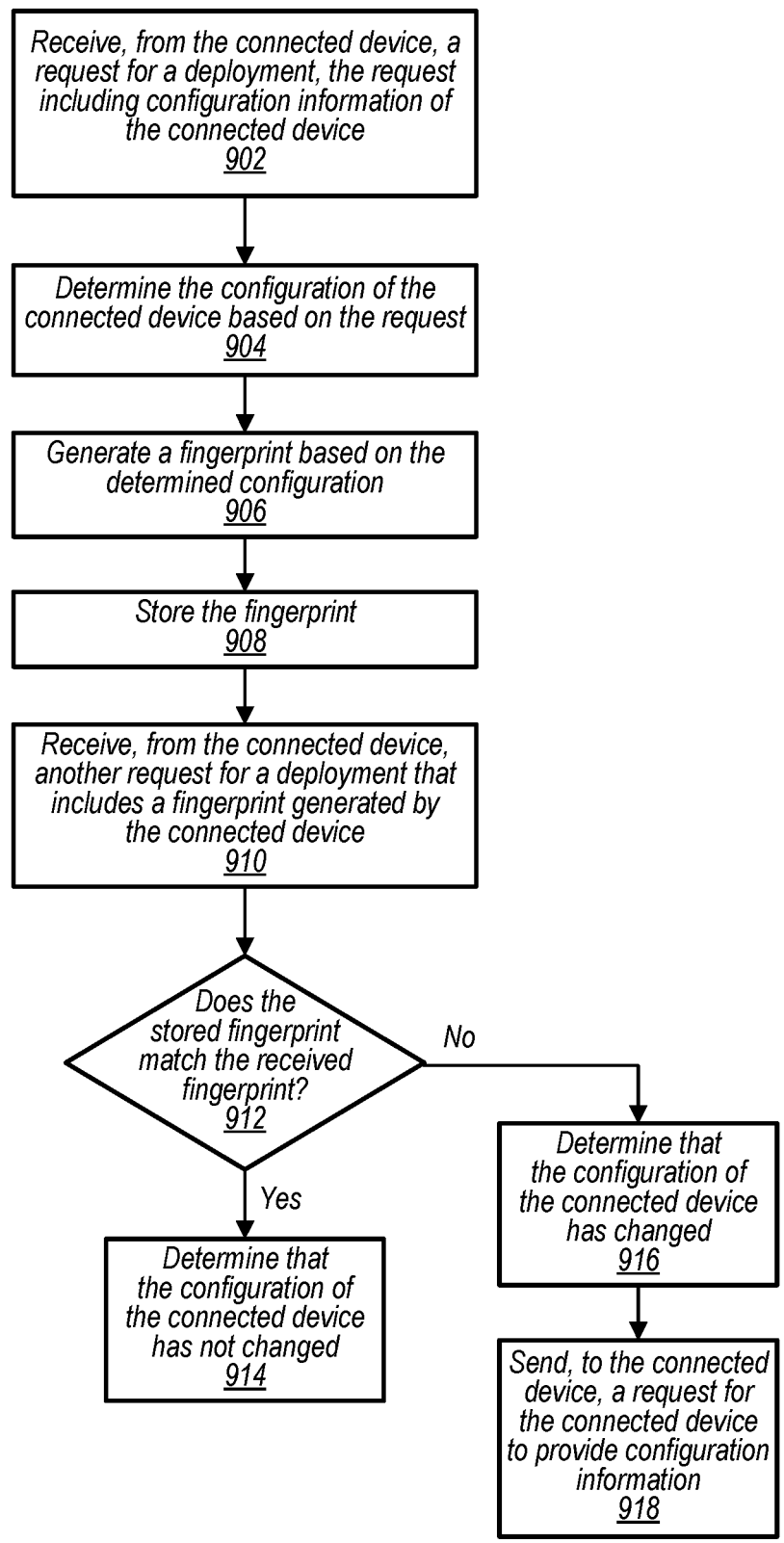
FIG. 9 is a flow diagram illustrating generating a fingerprint that corresponds to an IoT device configuration and using the fingerprint to determine whether the IoT device configuration has changed, according to some embodiments.

FIG. 9 is a flow diagram illustrating generating a fingerprint that corresponds to an IoT device configuration and using the fingerprint to determine whether the IoT device configuration has changed, according to some embodiments. At block 902, the IoT service receives, from a connected device of a remote client network, a request for a deployment. The request may include configuration information for the connected device, as described above (e.g., version and/or type of execution environment, processor architecture, GPU, FPU, etc.).

At block 904, the IoT service determines the configuration of the connected device based on the request. At block 906, the IoT service generates, based on the determined information, a fingerprint as a unique identifier for the configuration of the connected device. At block 908, the IoT service stores the fingerprint.

At block 910, the IoT service receives from the connected device another request for a deployment. The other request may include a fingerprint that was generated by the connected device. In some embodiments, the IoT service may receive the fingerprint in response to the connected device starting up. At block 912, the IoT service determines whether the received fingerprint matches the fingerprint stored by the IoT service. If so, then at block 914, the IoT service determines that the configuration of the connected device has not changed. The IoT service may then use the previously determined configuration information of the connected device (e.g., stored at the IoT service) in order to determine whether the connected device is compatible with the requested deployment.

At block 912, if the IoT service determines that the received fingerprint does not match the fingerprint stored by the IoT service, then at block 916, the IoT service determines that the configuration of the connected device has changed. At step 918, the IoT service sends to the connected device a request for the connected device to provide the new configuration information to the connected device.

As described above, in some embodiments, the connected device may perform the fingerprint comparisons and associated determinations instead of the IoT service. For example, the connected device may compare a fingerprint newly generated by the connected device to a previously generated fingerprint (either stored at the connected device or obtained from the IoT service). In some embodiments, both sides may perform the comparisons and associated determinations.

Figure 10:
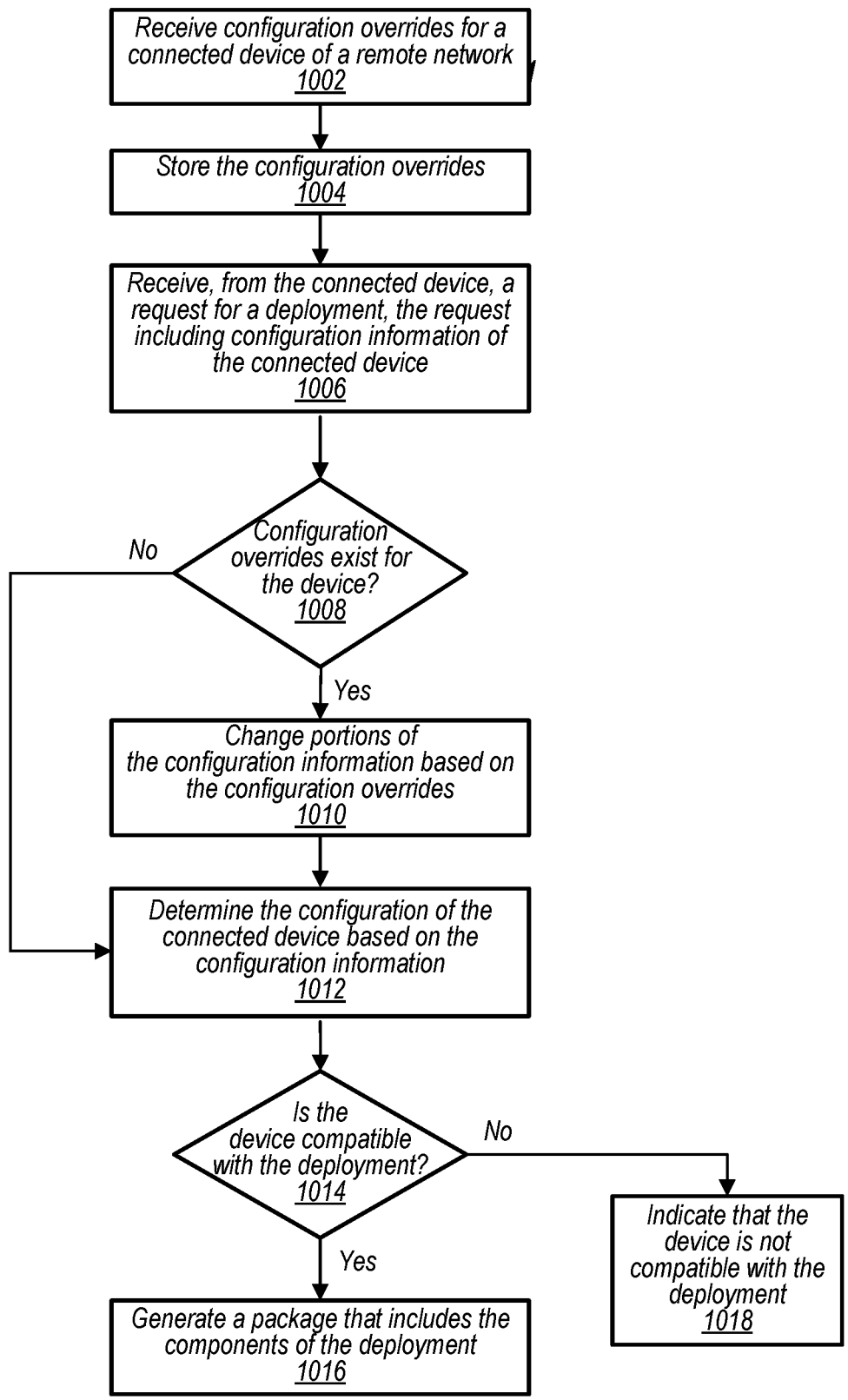
FIG. 10 is a flow diagram illustrating applying configuration overrides for configuration information of an IoT device, according to some embodiments.

FIG. 10 is a flow diagram illustrating applying configuration overrides for configuration information of an IoT device, according to some embodiments. At block 1002, the IoT service receives one or more configuration overrides for a connected device of a remote client network. At block 1004, the IoT service stores the one or more configuration overrides.

At block 1006, the IoT service receives, from the connected device, a request for a deployment, wherein the request includes configuration information of the connected device. At block 1008, the IoT service determines whether one or more configuration overrides exist for the connected device. If the IoT service determines that one or more configuration overrides exist for the connected device, then at block 1010, the IoT service changes one or more portions of the configuration information based on one or more of the respective configuration overrides for the connected device. If, however, the IoT service determines that configuration overrides do not exist for the connected device, then the process proceeds to block 1012.

At block 1012, the IoT service determines the configuration of the connected device based on the configuration information, which may have been changed based on one or more configuration overrides. At block 1014, the IoT service determines whether the connected device is compatible with the deployment, as described above. If the IoT service determines that the connected device is compatible with the deployment, then at block 1016 the IoT service generates a package that includes one or more components required for the deployment. At block 1014, if the IoT service determines that the connected device is not compatible with the deployment, then at block 1018 the IoT service indicates to the connected device that the connected device is not compatible with the deployment.

Figure 11:
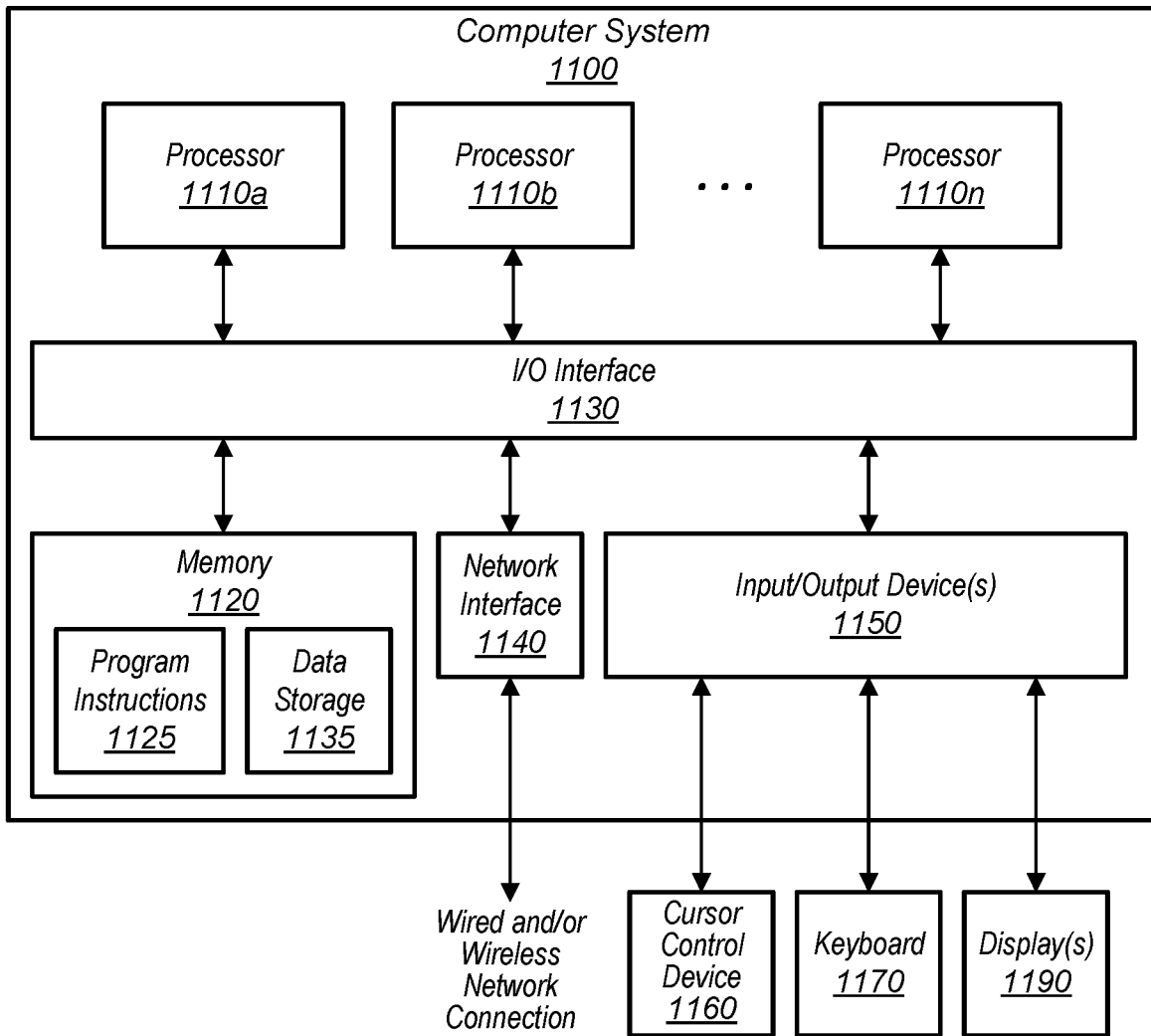
FIG. 11 is a block diagram illustrating an example computer system that implements some or all of the techniques described herein, according to some embodiments.

Any of various computer systems may be configured to implement processes associated with determining function compatibility with IoT devices and deploying functions to IoT devices. For example, FIG. 11 is a block diagram illustrating one embodiment of a computer system suitable for implementing at least some of the systems and methods described herein. In various embodiments, the connected devices 100, computing devices that implement services of the provider network 102, and/or any other described components may each include one or more computer systems 1100 such as that illustrated in FIG. 11 or one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or service provider are shown stored within system memory 1120 as program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the shippable storage device 100 and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.7, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the connected devices, various services or components of the provider network, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices of a provider network configured to:
   for individual ones of one or more connected devices of one or more remote networks:
   receive, from a deployment agent installed on the connected device of the remote network, a request for a deployment to be provided to the connected device, wherein the request sent from the deployment agent installed on the connected device to the provider network comprises both a unique identifier of the requested deployment and configuration information that indicates one or more of a hardware configuration or a software configuration of the connected device;
   determine a configuration of the connected device based at least in part on the configuration information;
   determine, based on the unique identifier of the deployment request received from the deployment agent of the connected device, a plurality of different components that are required for the deployment to be provided to the connected device;
   determine that the configuration of the connected device satisfies configuration requirements for the plurality of different components required for the deployment indicated by the request received from the deployment agent of the connected device; and
   in response to a determination that the configuration of the connected device satisfies the configuration requirements for the plurality of different components required for the deployment, perform at least one of:
   deploy a package to the connected device, or
   provide to the connected device a location from which the connected device can obtain the package.

2. The system as recited in claim 1, wherein individual ones of the components comprise a particular version of a plurality of versions of a function that are each configured to be executed by connected devices with different respective configurations, and wherein the one or more computing devices configured to:
   determine that the configuration of the connected device satisfies configuration requirements for the particular version of the function; and
   select the particular version of the function as one of the components to be included in the package.

3. The system as recited in claim 2, wherein the one or more computing devices are configured to:
   receive, from another connected device, a request for the deployment, wherein the request comprises information indicating a configuration of the other connected device that is different than the configuration of the connected device;
   determine that the configuration of the other connected device satisfies configuration requirements for another version of the function;
   select the other version of the function as one of the components to be included in another package; and
   in response to a determination that the configuration of the other connected device satisfies the configuration requirements for the deployment:
   deploying the other package to the other connected device, or
   providing to the other connected device a location from which the other connected device can obtain the other package, wherein the package and the other package comprise different versions of the function.

4. The system as recited in claim 1, wherein the configuration information of the request indicates one or more of: a version of an execution environment of the connected device, a processor architecture of the connected device, whether one or more interpreters are installed on the connected device, a type of an installed interpreter, whether the connected device comprises one or more graphics processing units (GPUs), a type of an installed GPU, whether the connected device comprises one or more floating point units (FPUs), a type of an installed FPU, whether the connected device comprises wireless communication capability, or a type of installed wireless communication capability.

5. The system as recited in claim 1, wherein the one or more computing devices are configured to:
   generate a fingerprint based on the determined configuration of the connected device;
   receive, from the connected device, another request for a deployment, wherein the other request comprises another fingerprint;
   determine, based on a comparison between the fingerprint and the other fingerprint, that the connected device is configured according to the previously determined configuration.

6. A method, comprising:
   performing, by one or more computing devices of a provider network:
   for individual ones of one or more connected devices of one or more respective remote networks:
   receiving, from a deployment agent installed on the connected device of the remote network, a request for a deployment to be provided to the connected device, wherein the request sent from the deployment agent installed on the connected device to the provider network comprises both a unique identifier of the requested deployment and configuration information that indicates one or more of a hardware configuration or a software configuration of the connected device;
   determining a configuration of the connected device based at least in part on the configuration information;
   determine, based on the unique identifier of the deployment request received from the deployment agent of the connected device, a plurality of different components that are required for the deployment to be provided to the connected device;

determining that the configuration of the connected device satisfies configuration requirements for the plurality of different components required for the deployment indicated by the request received from the deployment agent of the connected device; and in response to determining that the configuration of the connected device satisfies the configuration requirements for the plurality of different components required for the deployment, performing at least one of:

deploying a package to the connected device, or providing to the connected device a location from which the connected device can obtain the package.

7. The method as recited in claim 6, wherein the plurality of different components are required for the deployment, and wherein individual ones of the components comprise a particular version of a plurality of versions of a function that are each configured to be executed by connected devices with different respective configurations, and further comprising:

determining that the configuration of the connected device satisfies configuration requirements for the particular version of the function; and selecting the particular version of the function as one of the components to be included in the package.

8. The method as recited in claim 7, further comprising:
receiving, from another connected device, a request for the deployment, wherein the request comprises information indicating a configuration of the other connected device that is different than the configuration of the connected device;

determining that the configuration of the other connected device satisfies configuration requirements for another version of the function;

selecting the other version of the function as one of the components to be included in another package; and in response to determining that the configuration of the other connected device satisfies the configuration requirements for the deployment:

deploying the other package to the other connected device, or providing to the other connected device a location from which the other connected device can obtain the other package, wherein the package and the other package comprise different versions of the function.

9. The method as recited in claim 6, further comprising:
determining that one or more configuration overrides exist for the received configuration information; and changing one or more respective portions of the configuration information based on the one or more configuration overrides.

10. The method as recited in claim 6, further comprising:
generating a fingerprint based on the determined configuration of the connected device;

receiving, from the connected device, another request for a deployment, wherein the other request comprises another fingerprint;

determining, based on a comparison between the fingerprint and the other fingerprint, that the connected device is configured according to the previously determined configuration.

11. The method as recited in claim 10, further comprising:
receiving, from the connected device, an additional request for a deployment, wherein the additional request comprises an additional fingerprint;

determining, based on a comparison between the fingerprint and the additional fingerprint, that the configuration of the connected device has changed; and sending, to the connected device, a request for the connected device to provide configuration information for the connected device.

12. The method as recited in claim 6, further comprising:
sending, to the connected device, a notification that the deployment is available, wherein the notification comprises the unique identifier of the deployment, and wherein the provider network stores a plurality of different identifiers that correspond to different deployments.

13. The method as recited in claim 6, wherein the information of the request indicates one or more of: a version of an execution environment of the connected device, a processor architecture of the connected device, whether one or more interpreters are installed on the connected device, a type of an installed interpreter, whether the connected device comprises one or more graphics processing units (GPUs), a type of an installed GPU, whether the connected device comprises one or more floating point units (FPUs), a type of an installed FPU, whether the connected device comprises wireless communication capability, or a type of installed wireless communication capability.

14. The method as recited in claim 6, wherein the configuration information comprises an encoded representation of the configuration of the connected device, and wherein the determining the configuration of the connected device comprises:

decoding the encoded representation of the configuration.

15. The method as recited in claim 6, further comprising:
sending, to the connected device, an update notification for an execution environment of the connected device or an application installed on the connected device;

receiving, from the connected device, additional configuration information of the connected device;

generating an update package based on the additional configuration information; and sending the update package to the connected device.

16. A non-transitory computer-accessible storage medium storing program instructions that when executed on one or more processors of a connected device:

determine a configuration of the connected device;

send, from a deployment agent installed on the connected device to a service of a remote provider network a request for a deployment to be provided to the connected device, wherein the request sent from the deployment agent installed on the connected device to the service of the remote provider network comprises both a unique identifier of the requested deployment and configuration information that indicates one or more of a hardware configuration or a software configuration of the connected device based on the determined configuration, wherein the unique identifier is associated with a plurality of different components that are required for the deployment to be provided to the connected device;

receive a package from the service of the remote provider network, wherein the package comprises the plurality of different components of the deployment, and wherein the configuration of the connected device satisfies configuration requirements for the plurality of different components required for the deployment; and deploy the plurality of different components of the package at the connected device.

17. The storage medium as recited in claim 16, wherein the program instructions when executed on one or more processors:

generate, based on the determined configuration of the connected device, a fingerprint corresponding to the particular configuration of the connected device, wherein the configuration information of the request comprises the fingerprint.

18. The storage medium as recited in claim 17, wherein the program instructions when executed on one or more processors:

receive, from the service of the remote provider network, a notification that a new deployment is available;

in response to receiving the notification:
determine a subsequent configuration of the connected device;
generate, based on the subsequent configuration of the connected device, a fingerprint;
send to the service of the remote provider network a request for the new deployment, wherein the request comprises the fingerprint;
receive, from the service of the remote provider network, a request for the connected device to provide configuration information for the connected device; and
send to the service of the remote provider network configuration information of the connected device based on the subsequent configuration.

19. The storage medium as recited in claim 16, wherein the program instructions when executed on one or more processors:

in response to the connected device starting up:
determine a configuration of the connected device;
generate, based on the determined configuration of the connected device, a fingerprint; and
send, to the service of the remote provider network:
the fingerprint; and
configuration information of the connected device based on the determined configuration.

20. The storage medium as recited in claim 16, wherein the program instructions when executed on one or more processors:

encode information corresponding to the configuration to generate the configuration information, wherein the configuration information is an encoded representation of the information corresponding to the configuration.

* * * * *